United States Patent [19]  [11] 4,117,208
Ludwig  [45] Sep. 26, 1978

[54] ELECTRICAL CONVERSION DEVICE WITH CERAMIC ELECTRODE

[75] Inventor: Frank A. Ludwig, Southfield, Mich.

[73] Assignee: Ford Motor Company, Dearborn, Mich.

[21] Appl. No.: 833,547

[22] Filed: Sep. 15, 1977

[51] Int. Cl.² ............................................. H01M 6/18
[52] U.S. Cl. ...................................... 429/104; 429/218
[58] Field of Search .................. 429/104, 102, 103, 31, 429/191, 193, 218

[56] References Cited

U.S. PATENT DOCUMENTS

| 3,404,035 | 10/1968 | Kummer et al. | 429/104 X |
| 3,980,496 | 9/1976 | Ludwig et al. | 429/103 |
| 4,002,806 | 1/1977 | Gupta et al. | 429/104 |
| 4,020,246 | 4/1977 | Seo et al. | 429/104 |
| 4,024,320 | 5/1977 | Gibson et al. | 429/218 X |

FOREIGN PATENT DOCUMENTS 1,471,914  4/1977  United Kingdom ............ 429/104

Primary Examiner—Anthony Skapars
Attorney, Agent, or Firm—Roger L. May; Keith L. Zerschling

[57] ABSTRACT

An improved electrical conversion device of the type comprising:
(A) a container-current collector consisting essentially of an inner, load bearing, high strength, non-corrosive and electrically conductive ceramic member clad with a metal exterior;
(B) a cation-permeable barrier to mass liquid transfer which is disposed within said container-current collector;
(C) a molten alkali metal reactant-anode within the anodic reaction zone;
(D) a cathodic reactant within the cathodic reaction zone; and
(E) a cathodic electrode; the improvement of the invention comprises adapting the metal clad ceramic member of the device to serve not only as a container-current collector, but also as the cathodic electrode by shaping the metal clad ceramic member such that (i) the inner surface of the electrically conductive ceramic member is disposed in close proximity to at least a portion of the surface of the cation-permeable barrier, and (ii) there are a plurality of open spaces for channels within the cathodic reaction zone through which the cathodic reactants may flow during operation of the device.

9 Claims, 3 Drawing Figures

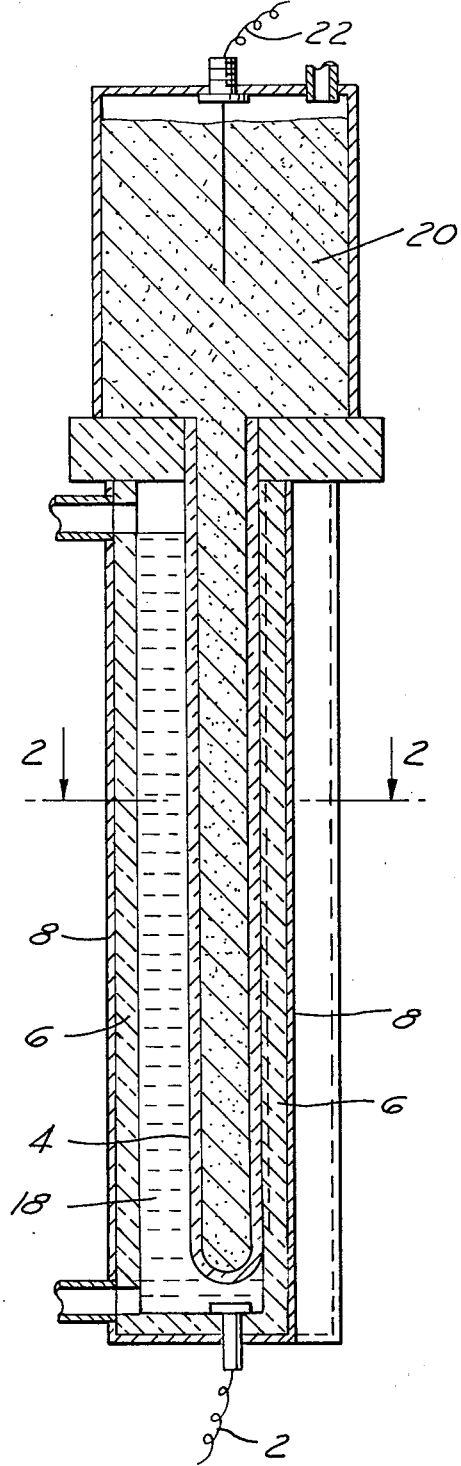
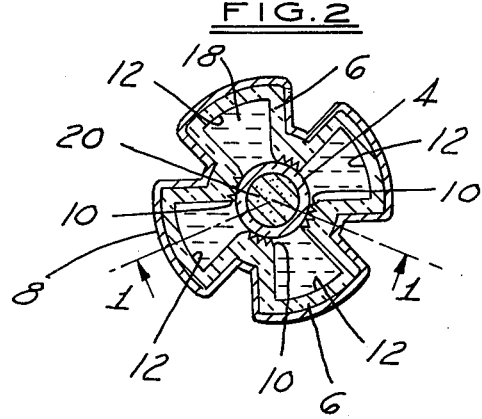
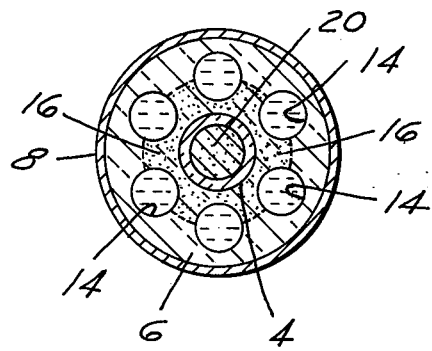

ELECTRICAL CONVERSION DEVICE WITH CERAMIC ELECTRODE

The invention described was made in the course of or under a contract or subcontract thereunder with the National Science Foundation.

This invention relates to certain new and improved electrical conversion devices. More particularly, this invention relates to electrical conversion devices wherein a load bearing, high strength, noncorrosive and electrically conductive ceramic member clad with a metal exterior serves not only as a current collector of the device, but also as the cathodic electrode.

A recently developed class of electrical conversion devices comprises: (1) an anodic reaction zone containing a molten alkali metal anode-reactant, e.g., sodium, in electrical contact with an external circuit; (2) a cathodic reaction zone containing a cathodic reactant comprising a liquid electrolyte, e.g., a mixture of molten sulfur and sodium polysulfide, which is electrochemically reactive with said anodic reactant; and (3) a solid electrolyte comprising a cation-permeable barrier to mass liquid transfer interposed between and in contact with said anodic and cathodic reaction zones. During the discharging cycle of a sodium-sulfur battery which exemplifies the devices improved in accordance with this invention, sodium atoms surrender an electron to an external circuit and the resulting sodium ion passes through the solid electrolyte barrier to unite with sulfur ions formed with electrons from the external circuit. Both electrons and cathodic reactant must be supplied to and distributed along the surface of the cathodic electrode in the vicinity of the cation-permeable barrier or solid electrolyte. The opposite procedure occurs during the charging cycle.

Two of the major considerations in designing such a device relate to the selection of the container material and the material and design for the cathodic electrode. The selection of a container material has been and continues to be a major concern because of the corrosive nature of the cathodic reactants employed in electrical conversion devices of the described type, e.g., the sodium sulfur battery. The cathodic electrode is, of course, critical to the operation of the device since it must transport electrons to the vicinity of the cation-permeable barrier during discharge of the device and transport electrons away from the vicinity of the barrier during charge. The electrode should have a large surface area and be disposed in the cathodic reaction zone such that it is in close proximity to and in electrical contact with the cation-permeable barrier and such that the cathodic reactants can move freely into and out of the vicinity of the electrode and the surface of the cation-permeable barrier. Additionally maximum reactants and reaction products must be maintained in contact with the maximum area of the cation-permeable barrier.

Several recent inventions have been directed toward achieving optimal properties and characteristics for the container and the cathodic electrode of such devices. U.S. Pat. No. 3,980,496 to Ludwig et al claims an electrical conversion device with an improved electrode structure. The invention of that patent employs conventional porous conductive material such as graphite felt as the electrode. In accordance with the invention the porous conductive material is disposed in the cathodic reaction zone such that there are a plurality of channels and/or spaces within the zone which are free of the porous conductive material or electrode and which are thus adapted to allow for free flow of the cathodic reactants during operation of the device. U.S. patent application Ser. No. 769,997 filed Feb. 18, 1977 discloses and claims a unique solution to the container problem. In accordance with the invention of that application the container, which also serves as the current collector of the device comprises an inner, load bearing, high strength, noncorrosive and electrically conductive ceramic member which is not subject to attack by the cathodic reactants of the electrical conversion devices of the described type and a highly conductive metal cladding intimately attached to the outer surface of the ceramic member. The metal cladding has a thickness which preserves the function of the ceramic member of the primary load bearing element. Devices contemplated by the invention of that application employ a separate porous electrode such as, for example, an electrode such as described and claimed in U.S. Pat. No. 3,980,496.

BRIEF DESCRIPTION OF THE INVENTION

Briefly the invention sought to be claimed herein comprises an improvement in electrical conversion devices comprising:

(A) a container-current collector consisting essentially of an inner load bearing, high strength, noncorrosive and electrically conductive ceramic member, and a highly conductive metal cladding intimately attached to the outer surface of the ceramic member;

(B) a cation-permeable barrier to mass liquid transfer which is disposed within said container-current collector so as to create an anodic reaction zone within the barrier and a cathodic reaction zone between the barrier and the container-current collector;

(C) a molten alkali metal reactant-anode within the anodic reaction zone in electrical contact with an external circuit;

(D) a cathodic reactant within the cathodic reaction zone which reactant is electrochemically reversibly reactive with the anodic reactant and which, when the device is in at least a partially discharged state is an electrolyte; and (E) a cathodic electrode for transporting electrons to the vicinity of the cation-permeable barrier during discharge of said device and for transporting electrons away from the vicinity of the cation-permeable barrier during charge of said device, said cathodic electrode being in electrical contact with both the cation-permeable barrier and the external circuit. The improvement of the invention comprises adapting the metal clad ceramic member described in (A) above to serve not only as a container-current collector for the device, but also as the cathodic electrode of the device by shaping the metal clad ceramic member such that (i) the inner surface of the electrically conductive ceramic member is disposed in close proximity to at least a portion of the surface of the cation-permeable barrier, and (ii) there are a plurality of open channels or spaces within said cathodic reaction zone through which the cathodic reactants may flow during operation of the device.

The invention will be more fully understood after reading the following detailed description thereof in conjunction with the drawings in which:

FIG. 1 is a vertical sectional view of a cell design incorporating the improvement of this invention; and FIGS. 2 and 3 are cross-sectional views of a cell such as shown in FIG. 1 showing several embodiments of the claimed invention.

DETAILED DESCRIPTION OF THE INVENTION

Description of Device to Which Improvement Applies

The general type of secondary or rechargeable electrical conversion devices to which the improvement of this invention applies, and various components thereof, are disclosed in numerous U.S. patents represented by the following, the disclosures of which are incorporated herein by reference: U.S. Pat. Nos. 3,404,035; 3,404,036; 3,458,356; 3,466,677; 3,468,709; 3,468,719; 3,475,220; 3,475,223; 3,475,225; 3,535,163; 3,719,531; 3,811,493; 3,951,689; 3,966,492; 3,976,503; 3,890,496; 3,985,575; 3,985,576; 3,933,503; 3,994,745; 4,002,806 and 4,002,807.

The particular container-current collector of the devices to which the improvement of this invention applies is described in detail in Ser. No. 769,997 mentioned above, the entire disclosure of which is hereby incorporated by reference. Generally that application discloses a container-current collector comprising an inner, load bearing, high strength, noncorrosive and electrically conductive ceramic member and a highly conductive metal cladding intimately attached to the outer surface of the ceramic member. The metal cladding (i) has a thickness which preserves the function of the element as the primary load bearing element, being based on the relative elastic modulus of the metal compared to that of the ceramic member, and (ii) is operable to receive and shunt current flow from an inner surface of the container-current collector to an external contact.

As disclosed in Ser. No. 769,997, preparation of suitable highly conductive oxide ceramics is accomplished by four commonly accepted methods: (1) intrinsic high conductivity, (2) reduction of the oxide ceramic causing a deficiency in oxygen ions and subsequent electrical compensation by the addition of conducting electrons, (3) controlled addition of an ionic species differing from the solute cationic species in both constitution and electric charge, the added species occupying an interstitial crystal site, charge neutrality considerations creating conducting electrons and higher conductivity, and (4) controlled addition of an ionic species differing from the solute cationic species in both constitution and electric charge, the added species occupying by substitution the sites of the parent cationic species with charge neutrality considerations producing conducting electrons.

Intrinsic high conductivity is exhibited by ruthenium oxide, a compound normally considered uneconomical because of the rare occurrence of ruthenium in nature. Methods (2) and (3) normally result in the creation of charged, mobile atomic entities which can move easily under the force due to an electric field. Method (4) offers the greatest promise for applicability in the container described in that the addition of impurity ions in a substitutional manner usually produces a nearly immobile impurity except at very high temperatures.

Three economically viable metal oxides which may be made conducting and which are economically viable because of natural abundance are calcium titanate ($CaTiO_3$), strontium titanate ($SrTiO_3$) and one of the derivatives of both titanates, titanium dioxide ($TiO_2$) in the rutile crystallographic form. Common substitutional additive ions for all of these oxides include iron in the +3 oxidation state and aluminum in the +3 oxidation state. Greater electronic conductivity increase may be accomplished by the addition of tantalum in the +5 oxidation state or niobium in the +5 oxidation state because the solubility of these elements is larger than either iron or aluminum and because the charge carriers created from the niobium or tantalum impurity additions remain nearly free for electronic current flow whereas the charge carriers created from the addition of iron or aluminum are largely trapped on the impurity except at very high temperatures.

By far the most common method of adding niobium or tantalum to these metal oxides, when the resulting ceramic is to be polycrystalline, is the simple mixing of fine powders of niobiumpentoxide ($Nb_2O_5$) or tantalum pen pentoxide ($Ta_2O_5$) with fine powders of the solute substance $CaTiO_3$, $SrTiO_3$ or $TiO_2$. Subsequent processing by commonly known arts of pressing the mixed powders into green ceramic form and sintering at a suitable temperature yield a black, dense ceramic with conductivity drastically enhanced over the pure solvent.

The metal-ceramic combination must possess the characteristics of corrosion resistance, high electronic conductivity for the ceramic and the ability of the metal coating to be intimately placed onto the outside of the ceramic with negligible contact resistance between the electronic ceramic and the metal. Furthermore, the metal systems must not readily oxidize below 400° C., thereby causing the subsequent electrical degradation of the metal-ceramic interface. The following metal-ceramic combinations have demonstrated such characteristics in the containment of molten sodium polysulfides:

(1) Tantalum doped rutile ($TiO_2$) covered with a cladding of (either sputtered, electrolytically or chemically deposited) nickel.

(2) Tantalum doped rutile ($TiO_2$) covered with a metal cladding of aluminum.

(3) Tantalum doped rutile ($TiO_2$) covered with a metal cladding of silicon (overcoated with platinum).

(4) Niobium doped rutile covered with a metal cladding of platinum.

(5) Iron doped calcium titanate covered with a coating of gold.

(6) Reduced strontium titanate covered with a coating of gold.

(7) Lathanum strontium chromite ($La_{0.84}Sr_{0.16}CrO_3$) covered with a metal cladding of platinum.

The anodic reactant or sacrificial electrode employed in such devices to which the improvement of this invention applies is an alkali metal which is maintained above its melting point when the device is in operation. Sodium is the preferred alkali metal for use in such devices; however, potassium lithium, other alkali metals, mistures of such alkali metals, or alloys containing such alkali metals can also be used.

The cathodic reactant of the fully charged device preferably is molten sulfur, which is electrochemically reversibly reactive with the anodic reactant. Formation of polysulfide salts and the phase change of the cathodic reactant during discharge and charge cycles of the device are well recognized in the art and are described in detail in a number of the above patents and applications.

The anodic reactant is separated from the cathodic reactant by a solid barrier to mass liquid transfer that is selectively ionically conductive with respect to cations of the anodic reactant and substantially impermeable to other ions which may be stored in the cathodic reactant.

The nature of cation-permeable barrier is discussed in detail in a number of the above referenced patents and applications. As noted in those disclosures, both glasses and polycrystalline ceramic materials are suitable for use in such devices as the solid electrolyte. Polycrystalline ceramic materials useful are bi- or multi-metal oxides, and those most useful are those in the family of beta-alumina, all of which exhibit a generic crystalline structure which is readily identifiable by X-ray diffraction. Beta-type alumina materials are well known in the art and those beta-type aluminas which are most suitable for use in the secondary battery or cells to which the improvement of this invention relates are described in the above patents and applications as well as in the open literature. Among the most preferred useful beta-type aluminas are:

(1) Standard beta-type alumina comprising a series of layers of aluminum oxide held apart by layers of linear Al—O bond chains with sodium occupying sites between the layers and columns;

(2) Boron oxide modified beta-type alumina;

(3) Substituted beta-type alumina wherein sodium ions are replaced in whole or in part by other positive ions which are preferably metal ions; and (4) Beta-type alumina modified by the addition of a minor proportion by weight of metal ions having a valence not greater than 2, preferably lithium or magnesium or a combination of lithium and magnesium.

The cathodic electrode of the type of electrical conversion device to which the improvement of this invention applies is a conductive material, preferably porous in part, which is electronically conductive and which is resistant to attack by reactants within the cathodic reaction zone.

Improvement of the Invention

The improvement of the invention comprises adapting the metal clad ceramic member of the above described device to serve not only as a container-current collector for the device, but also as the cathodic electrode of the device by shaping the metal clad ceramic member such that (i) the inner surface thereof is disposed in close proximity to at least a portion of the surface of the cation-permeable barrier, and (ii) there are a plurality of open channels or spaces within the cathodic reaction zone through which the cathodic reactants may flow during operation of the device. Preferably, the conductive ceramic member is disposed within 8 mm or less, preferably 3 mm or less, of at least a portion of the surface of the cation-permeable barrier.

Various designs for the disposition of the electrically conductive ceramic member electrode within the cathodic reaction zone of the device may be employed. In one particularly preferred design, the ceramic member is in close proximity to only a portion of the surface of the cation-permeable barrier such that at least a portion of the channels or spaces within the cathodic reaction zone extend from the cation-permeable barrier to the exterior of the cathodic reaction zone. Such a design may be achieved, for example in the case of a cell employing a cylindrical cation-permeable barrier, by employing a metal clad electrically conductive ceramic member which has an exterior cylindrical surface and which is of nonuniform thickness, i.e., the electrically conductive ceramic layer is nonuniform in thickness and at certain portions thereof extends inwardly to the wall of the cation-permeable barrier in regions where it has the greatest thickness and in other regions does not extend to the barrier, thus leaving open spaces or channels through which the cathodic reactants may flow during operation of the device. Still another design in which the electrically conductive ceramic member is in close proximity to only a portion of the surface of the cation-permeable barrier may be achieved when the cation permeable barrier is cylindrical and the electrically conductive ceramic member clad with the metal is noncylindrical, with portions thereof being in close proximity to the barrier while other portions curve outwardly from the barrier so as to create open spaces or channels. In such a design, the electrically conductive ceramic member may be uniform in thickness.

In still another type of design which may be employed within the broad scope of the invention, the electrically conductive ceramic member is in close proximity to the entire surface of the cation-permeable barrier within the cathodic reaction zone. In this type of design at least a portion of the channels or spaces within the cathodic reaction zone are bounded entirely by the ceramic member and at least a portion of the ceramic member, including those portions between the channels or spaces and those portions between the channels or spaces and the cation-permeable barrier, is porous such that the cathodic reactants may flow therethrough during operation of the device. Porous electrically conductive ceramic members may be made by incorporating conventional blowing agents in the ceramic material during preparation thereof. These techniques will be apparent to those skilled in the art.

Preferably the electrically conductive ceramic surface which is in close proximity to the cation-permeable barrier is roughened so as to exhibit increased surface area and so as to create minor channels or spaces between the cation-permeable barrier and the surface of the ceramic member, through which cathodic reactants may flow during operation of the device.

The improvement of the invention will be more fully understood from the following specific example and the detailed description of the drawings in which the numerals common to each drawing define a common component of the cell shown therein.

DETAILED DESCRIPTION OF THE DRAWINGS

FIG. 1 shows a full vertical cross-section of the preferred cell design incorporating the improvement of this invention.

FIG. 2 is a cross-sectional view taken along line 2—2 of FIG. 1.

FIG. 3 is a cross-sectional view of another cell design within the purview of the invention.

The cell shown in FIGS. 1 and 2 comprises a tubular cation-permeable barrier 4 disposed internally of electrically conductive ceramic 6 clad with conductive metal 8. The metal clad electrically conductive ceramic member has a noncylindrical cross-section as most clearly shown in FIG. 2. The load bearing electrically conductive ceramic member 6 may be in electrical contact with an external circuit via lead 2. In the particular design shown in FIGS. 1 and 2 the metal clad electrically conductive member 6 is in close proximity to the cation-permeable barrier 4 at only selected places 10, thus leaving open regions 12 between the cation-permeable barrier and the electrically conductive ceramic member 6 in those regions which are not in close proximity. Those regions which are in close proximity are shown in FIG. 2 as having a roughened edge which increases the surface area of the electrically conductive ceramic and creates channels or spaces through which the cathodic reaction may flow during operation of the cell.

Other features of the cell shown are alkali metal anodic reactant 20 which fills the interior of cation permeable barrier 6 and is in contact with the external circuit via lead 22 and cathodic reactant 18 which fills the open spaces within the cathodic reaction zone.

An alternative embodiment, not shown in the drawing, which also comprises open regions bounded in part by the cation-permeable barrier, could be achieved by using a cylindrical metal clad electrically conductive ceramic member wherein the electrically conductive ceramic 6 is of nonuniform thickness, extending to the surface of the cation-permeable barrier 4 in certain regions and extending away from the barrier in other regions so as to create channels or spaces through which the cathodic reactant may flow.

The cross section of FIG. 3 is representative of another embodiment of the invention wherein electrically conductive ceramic 6 clad with metal layer 8 is in close proximity to the entire surface of the cation-permeable barrier 4. This particular design includes open spaces or channels 14 which are completely surrounded by the electrically conductive ceramic 6 and through which the cathodic reactant may flow during operation of the cell. In this design the electrically conductive ceramic 6 in close proximity to the cation-permeable barrier 4 is shown as being porous. This porous zone 16 extends from the region directly adjacent to the cation-permeable barrier to the open regions or channels 14 such that cathodic reactant may flow from the open regions through the porous ceramic to the regions directly adjacent to the cation-permeable barrier 4.

EXAMPLE

A $TiO_2$ (rutile) container similar in design to that shown in FIG. 2 is doped with 1% tantalum and prepared by methods described in U.S. Ser. No. 769,997. The external surface is electroless nickel plated by conventional methods. The dimensions of the container are: 21 cm long; maximum outer diameter, 4.0 cm; minimum outer diameter, 1.8 cm; ceramic thickness, 0.2 cm; nickel thickness, 0.01 cm. The $\beta''$-alumina solid electrolyte is tubular and 1.5 cm in outer diameter. Thus, there is less than 0.05 cm clearance between the minimum dimensions of the container and the solid electrolyte. This area of minimum clearance is roughened by sandblasting the rutile ceramic surface with coarse $Al_2O_3$ powder.

The top of the container is bonded to an insulating ceramic header using a glass seal. The assembly is then filled two-thirds full with sulfur, a teflon coated mandrel being inserted to keep the sulfur from the region into which the $\beta''$-alumina solid electrolyte will be inserted. When the sulfur has solidified, the mandrel is withdrawn. The $\beta''$-alumina tube is inserted and sealed with glass to the ceramic header. Care must be taken to keep the sulfur cool. During insertion of the $\beta''$-tube a small piece of graphite felt is inserted to obtain some initial contact between the $\beta''$-alumina and the ceramic electrode. This is required only for the initial discharge during start-up of the cell.

After the sodium chamber is sealed to the ceramic header and filled with sodium, the leads are attached to the cell, and the cell can be heated and operated.

In view of this disclosure, many modifications of the improvement of this invention will be apparent to those skilled in the art. It is intended that all such modifications which fall within the scope of this invention be included within the terms of the appended claims.

I claim:

1. In an electrical conversion device comprising:
   A. A container-current collector consisting essentially of an inner, load bearing, high strength, non-corrosive and electrically conductive ceramic member, and a highly conductive metal cladding intimately attached to the outer surface of said ceramic member, said metal cladding having a thickness which preserves the function of said ceramic member as the primary load bearing element, being based on the relative elastic modulus of the metal compared to that of said ceramic member, said metal-cladding being operable to receive and shunt current flow from an inner surface of said container-current collector to an external contact;
   B. A cation-permeable barrier to mass liquid transfer which is disposed within said container-current collector so as to create an anodic reaction zone within said barrier and a cathodic reaction zone between said barrier and the exterior of said container-current collector;
   C. A molten alkali metal reactant-anode within said anodic reaction zone in electrical contact with an external circuit;
   D. A cathodic reactant within said cathodic reaction zone which reactant is electrochemically reversibly reactive with said anodic reactant and which, when said device is in at least a partially discharged state, is an electrolyte; and
   E. A cathodic electrode for transporting electrons to the vicinity of said cation-permeable barrier during discharge of said device and for transporting electrons away from the vicinity of said cation permeable barrier during charge of said device, said cathodic electrode being in electrical contact with both said cation-permeable barrier and said external circuit,
   wherein the improvement comprises adapting the metal clad ceramic member described in A. to serve not only as a container-current collector for said device, but also as the cathodic electrode of said device by shaping said metal clad ceramic member such that (i) the inner surface of said electrically conductive ceramic member is disposed in close proximity to at least a portion of the surface of said cation-permeable barrier, and (ii) there are a plurality of open channels or spaces within said cathodic reaction zone through which said cathodic reactants may flow during operation of said device.

2. An electrical conversion device in accordance with claim 1 wherein said inner surface of said electrically conductive ceramic member is disposed within 8 mm or less of at least a portion of the surface of said cation-permeable barrier.

3. An electrical conversion device in accordance with claim 1 wherein said inner surface of said electrically conductive ceramic member is disposed within 3 mm or less of at least a portion of the surface of said cation-permeable barrier.

4. An electrical conversion device in accordance with claim 1 wherein said electrically conductive ceramic member is in close proximity to only a portion of the surface of said cation permeable barrier within said cathodic reaction zone, such that at least a portion of said channels or spaces extend from the exterior of said cathodic reaction zone to said barrier.

5. An electrical conversion device in accordance with claim 4 wherein said electrically conductive ceramic member has a nonuniform thickness.

6. An electrical conversion device in accordance with claim 4 wherein those portions of the surface of said electrically conductive ceramic member in close proximity to said cation-permeable barrier are roughened so as to exhibit increased surface area and so as to create minor channels or spaces between said cation-permeable barrier and said surface through which said cathodic reactants may flow during operation of said device.

7. An electrical conversion device in accordance with claim 1 wherein (i) said ceramic member is in close proximity to the entire surface of said cation-permeable barrier within said cathodic reaction zone, (ii) at least a portion of said channels or spaces are bounded entirely by said ceramic member, and (iii) at least a portion of said ceramic member, including those portions between said channels or spaces and those portions between said channels or spaces and said cation-permeable barrier, is porous such that said cathodic reactant may flow therethrough during operation of said device.

8. An electrical conversion device in accordance with claim 1 wherein the thickness of said ceramic member in said metal clad ceramic composite is substantially uniform.

9. An electrical conversion device in accordance with claim 8 wherein said metal clad ceramic composite is disposed in a configuration such that said electrically conductive ceramic is in close proximity to only a portion of the surface of said cation permeable barrier within said cathodic reaction zone and such that at least a portion of said channels or spaces extend from the exterior of said cathodic reaction zone to said barrier.

* * * * *